(12) United States Patent
Zhao

(10) Patent No.: US 12,492,046 B2
(45) Date of Patent: Dec. 9, 2025

(54) SEALING DEVICE FOR CAPSULE PRODUCT AND OPERATION METHOD THEREOF

(71) Applicant: Xiaohai Zhao, Guangdong (CN)

(72) Inventor: Xiaohai Zhao, Guangdong (CN)

( * ) Notice: Subject to any disclaimer, the term of this patent is extended or adjusted under 35 U.S.C. 154(b) by 0 days.

(21) Appl. No.: 18/942,976

(22) Filed: Nov. 11, 2024

(65) Prior Publication Data

US 2025/0282529 A1    Sep. 11, 2025

Related U.S. Application Data

(63) Continuation-in-part of application No. 29/931,595, filed on Mar. 7, 2024, now Pat. No. Des. 1,055,631.

(51) Int. Cl.
*B65D 43/02* (2006.01)
*B65B 7/28* (2006.01)

(52) U.S. Cl.
CPC ............ *B65D 43/0204* (2013.01); *B65B 7/28* (2013.01); *B65D 2543/00037* (2013.01); *B65D 2543/0062* (2013.01)

(58) Field of Classification Search
CPC ......... B65B 7/28; B65B 31/028; B65B 7/164; B65B 51/14; B65B 29/022; B65B 7/2878; B65D 43/0204; B65D 2543/00037; B65D 2543/0062; B29C 65/18; B29C 66/112; B29C 66/131; B29C 66/53461; B29C 65/7451; B29C 66/849; B29C 65/7461
See application file for complete search history.

(56) References Cited

U.S. PATENT DOCUMENTS

| | | | |
|---|---|---|---|
| 2013/0263559 A1* | 10/2013 | Scolaro ............... | B29C 66/8242 53/329.2 |
| 2021/0002028 A1* | 1/2021 | Perry ................. | B65D 43/0204 |
| 2023/0227187 A1* | 7/2023 | Bartoli .................. | B65B 51/225 53/477 |
| 2024/0101340 A1* | 3/2024 | Krüger ................. | B65B 29/022 |
| 2024/0399675 A1* | 12/2024 | Gkioulen .......... | B29C 66/73921 |

* cited by examiner

*Primary Examiner* — Veronica Martin
(74) *Attorney, Agent, or Firm* — HOWARD M COHN and Associates, LLC

(57) ABSTRACT

A sealing device for a capsule product is provided. The sealing device for the capsule product includes a base and an upper cover. The base defines an accommodating groove having an upper opening, and the base includes the positioning baffle disposed at one side of the accommodating groove. The upper cover is detachably connected to the base, a pressing portion is disposed on a lower surface of the upper cover.

19 Claims, 15 Drawing Sheets

SEALING DEVICE FOR CAPSULE PRODUCT AND OPERATION METHOD THEREOF

TECHNICAL FIELD

The present disclosure relates to a technical field of sealing apparatus, and in particular to a sealing device for a capsule product and an operation method thereof.

BACKGROUND

Capsule products each is typically composed of a capsule shell and a product contained therein. A corresponding capsule shell includes a cup body and a sealing cover, the cup body features a protruding edge at a top end thereof for tightly sealing with the sealing cover after a desired product, such as coffee, barley, milk power, tea, etc., has been filled in the cup body, so as to enable sealing and storage of the desired product. When using the capsule products, the user only needs to puncture or uncover a corresponding sealing cover to get in contact with a corresponding desired product contained in a corresponding cup body and use the corresponding desired product. However, most of the capsule products currently in the marked are pre-made products, making it difficult to meet different customer requirements. Moreover, although the corresponding capsule shell of the capsule products remain intact during use, it is often discarded after use, undoubtedly representing a waste of resources.

SUMMARY

Embodiments of the present disclosure provide a sealing device for a capsule product and an operation method thereof, which improves sealing stability of a sealing piece and a cup body through a positioning baffle and is capable of customizing the capsule product according to different customer requirements.

In a first aspect, the embodiments of the present disclosure provide the sealing device for the capsule product, including a base and an upper cover. The base defines an accommodating groove having an upper opening, and the base includes the positioning baffle disposed at one side of the accommodating groove. The upper cover is detachably connected to the base, a pressing portion is disposed on a lower surface of the upper cover.

In some embodiments, an annular protrusion is disposed on an upper surface of the base and is annularly disposed at an outer periphery of the upper opening of the accommodating groove.

In some embodiments, a positioning concave portion is further defined on the lower surface of the upper cover, the positioning baffle is at least partially inserted into the positioning concave portion and slides in the positioning concave portion.

In some embodiments, the positioning concave portion is of an annular structure.

In some embodiments, the capsule product includes a capsule shell and a sealing piece, the capsule shell includes a cup body having a receiving groove, a flange connected to a top portion of the cup body and extending in a radial direction, and a crimping edge connected to an outer periphery of the flange, the sealing piece is attached to the flange and is configured to seal the receiving groove. An annular limiting portion is further disposed on the lower surface of the upper cover and is annularly disposed at an outer periphery of the pressing portion, an annular recess is formed between the annular limiting portion and the pressing portion, the cup body is disposed in the accommodating groove, the flange is clamped between the pressing portion and the annular protrusion, the crimping edge is inserted into the annular recess, and an outer periphery of the crimping edge abuts against an inner wall surface of the annular limiting portion.

In some embodiments, the upper cover includes a cover body and a top cover, the pressing portion is disposed on a bottom portion of the cover body, the pressing portion is of an annular structure matched with the annular protrusion, the cover body defines a through hole at an inner side of the pressing portion, the top cover is detachably connected to a top portion of the cover body for covering or exposing the through hole. When the cover body is disposed on the base and the top cover is disconnected to the top portion of the cover body, a powdered product is placed into the receiving groove through the through hole.

In some embodiments, a protruding structure is disposed on an upper surface of the upper cover, a shape of the protruding structure is matched with a shape of the upper opening of the accommodating groove, and the protruding structure is configured to flatten a powered product in the receiving groove.

In some embodiments, in a radial direction, a distance between of an inner wall surface of the positioning baffle and an outer wall surface of the annular protrusion is not less than 0.1 mm and is not greater than 5 mm.

In some embodiments, in the radial direction, a dimension of the annular protrusion is not less than 0.2 mm and not greater than 5 mm; and/or in a vertical direction, the dimension of the annular protrusion is not less than 0.1 mm and not greater than 10 mm.

In some embodiments, the pressing portion is a planar structure extending in a horizontal direction.

In some embodiments, the base defines a positioning groove at an outer periphery thereof, a positioning protruding portion is disposed at an outer periphery of the upper cover, the positioning groove is configured to limit the positioning protruding portion and is matched with the positioning protruding portion, so as to prevent the upper cover and the base from being separated from each other in the radial direction.

In some embodiments, the positioning baffle is of an arc-shaped structure, the base has a circle passing through the positioning baffle in a circumferential direction thereof, an arc length occupied by the positioning baffle on the circle does not exceed a circumference of the circle and is not less than one quarter of the circumference of the circle.

In some embodiments, an anti-slip pad is disposed on a lower surface of the base.

In some embodiments, the sealing device for the capsule product further includes a cutting structure, the cutting structure includes a mounting base and a blade assembly, a limiting groove is defined on a first side of the mounting base, the blade assembly includes a fixing base and a blade fixed on the fixing base, the mounting base includes a limiting hole penetrating through two opposite sides thereof, and the limiting hole is defined in the limiting groove, the blade partially extends out from the limiting hole.

An outer periphery of the capsule shell abuts against a groove side wall of the limiting groove, the capsule shell rotates in the limiting groove, the blade is configured to cut a part of the sealing piece when the capsule shell rotates with respect to the mounting base, where the part of the sealing piece is disposed at an inner side of the flange.

In some embodiments, an included angle is formed between the blade and a horizontal direction, the blade partially extends out from the limiting hole and is inclined in a direction away from an edge of the capsule shell.

In some embodiments, the included angle between the blade and the horizontal direction is α, the α satisfies a relationship as follows:

$$55° \leq \alpha \leq 95°.$$

In some embodiments, the fixing base includes a first base body and a second base body, the first base body is detachably connected to the second base body, the first base body includes a first mounting surface, the first mounting surface is inclined, the second base body includes a second mounting surface, the second mounting surface is inclined, the blade is clamped between the first mounting surface and the second mounting, so as to form the included angle with the horizontal direction.

In some embodiments, a first mounting groove and a second mounting groove are defined on a second side of the mounting base facing away from the limiting groove, the first mounting groove is communicated with the limiting hole, the blade assembly is fixed at the first mounting groove in a use state, and the blade assembly is accommodated in the second mounting groove in an idle state.

In some embodiments, the mounting base includes a mounting portion, the mounting portion defines the first mounting groove, the mounting portion includes a hook, the fixing base defines a clamping groove. When the fixing base is fixed at the first mounting groove, the hook is snap-fitted to the clamping groove.

In a second aspect, the embodiments of the present disclosure further provides a first embodiment of the operation method of the sealing device for the capsule product, in which the capsule product includes the capsule shell and the powdered product contained in the capsule shell, the capsule shell includes the cup body and the sealing piece, the cup body defines the receiving groove and includes the flange at the top portion thereof, the flange extends in the radial direction, the sealing piece is attached to the flange and is configured to seal the receiving groove, the sealing device for the capsule product includes the base and the upper cover, the base defines the accommodating groove having the upper opening, the annular protrusion is disposed on the upper surface of the base and is annularly disposed at the outer periphery of the upper opening of the accommodating groove, the accommodating groove is configured to accommodate the cup body, the annular protrusion is configured to support the flange, the base includes the positioning baffle disposed at the one side of the accommodating groove, and the positioning baffle is configured to limit the sealing piece, the upper cover is detachably connected to the base, the pressing portion is disposed on the lower surface of the upper cover.

The operation method of the sealing device for the capsule product includes following steps.

Placing the cup body of the capsule shell of the capsule product in the accommodating groove of the base of the sealing device for the capsule product, supporting the flange of the cup body on the annular protrusion of the base.

Placing the powdered product into the receiving groove of the cup body.

Abutting an outer wall surface of the sealing piece of the capsule shell against an inner wall of the positioning baffle of the base, and attaching the sealing piece to the flange.

Covering the base by the upper cover of the sealing device of the capsule product, so as to seal and attach the sealing piece to the flange.

In a third aspect, the embodiments of the present disclosure further provides a second embodiment of the operation method of the sealing device for the capsule product, in which the capsule product includes the capsule shell and the powdered product contained in the capsule shell, the capsule shell includes the cup body and the sealing piece, the cup body defines the receiving groove and includes the flange at the top portion thereof, the flange extends in the radial direction, the sealing piece is attached to the flange and is configured to seal the receiving groove, the sealing device for the capsule product includes the base and the upper cover, the base defines the accommodating groove having the upper opening, the annular protrusion is disposed on the upper surface of the base and is annularly disposed at the outer periphery of the upper opening of the accommodating groove, the accommodating groove is configured to accommodate the cup body, the annular protrusion is configured to support the flange, the base includes the positioning baffle disposed at the one side of the accommodating groove, and the positioning baffle is configured to limit the sealing piece, the upper cover includes the cover body and the top cover, the cover body is detachably connected to the base, and the pressing portion is disposed on the bottom portion of the cover body, the cover body defines the through hole at the inner side of the pressing portion, the top cover is detachably connected to the top portion of the cover body for covering or exposing the through hole. The operation method of the sealing device for the capsule product includes following steps.

Placing the cup body of the capsule shell of the capsule product in the accommodating groove of the base of the sealing device for the capsule product, supporting the flange of the cup body on the annular protrusion of the base.

Placing the powdered product into the receiving groove of the cup body, or covering the base by the cover body of the upper cover of the sealing device for the capsule product and placing the powdered product into the receiving groove through the through hole of the cover body.

Removing the cover body, abutting the outer wall surface of the sealing piece of the capsule shell against the inner wall of the positioning baffle of the base, and attaching the sealing piece to the flange.

Covering the base by the upper cover of the sealing device of the capsule product, so as to seal and attach the sealing piece to the flange.

According to the sealing device for the capsule product of the embodiments of the present disclosure, the upper cover is detachably connected to the base, and the annular protrusion is configured to support the flange, in a process of covering the base by the upper cover, the annular protrusion is matched with the pressing portion of the upper cover to clamp the sealing piece and the flange, thereby tightly attaching the sealing piece to the flange, in this way, external air, moisture, or contaminants are effectively prevented from entering an interior of the capsule shell, thereby enabling freshness and quality of a solid or semi-solid product, such as coffee, barley, milk powder, tea, etc., contained in the capsule shell. When the sealing pieces covers the cup body, the positioning baffle is configured to limit the sealing piece to prevent the sealing piece from deviating, thereby improving a sealing effect.

The sealing device for the capsule product of the embodiments of the present disclosure adopts a simple mechanical structure, which does not need complex processing or expensive materials, the base and the upper cover are both simple in structures, easy to produce, and have low production costs, thereby having a better market competitiveness. At the same time, since the sealing device for the capsule product is easy to manufacture, a use cost of a user is also reduced. Moreover, the sealing device for the capsule product of the present disclosure is small in size, which is beneficial to saving storage space and is convenient to carry and transport.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Implementations, functional features, and advantages of the present disclosure are further described with reference to the accompanying drawings in combination with the embodiments.

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Figure 1:
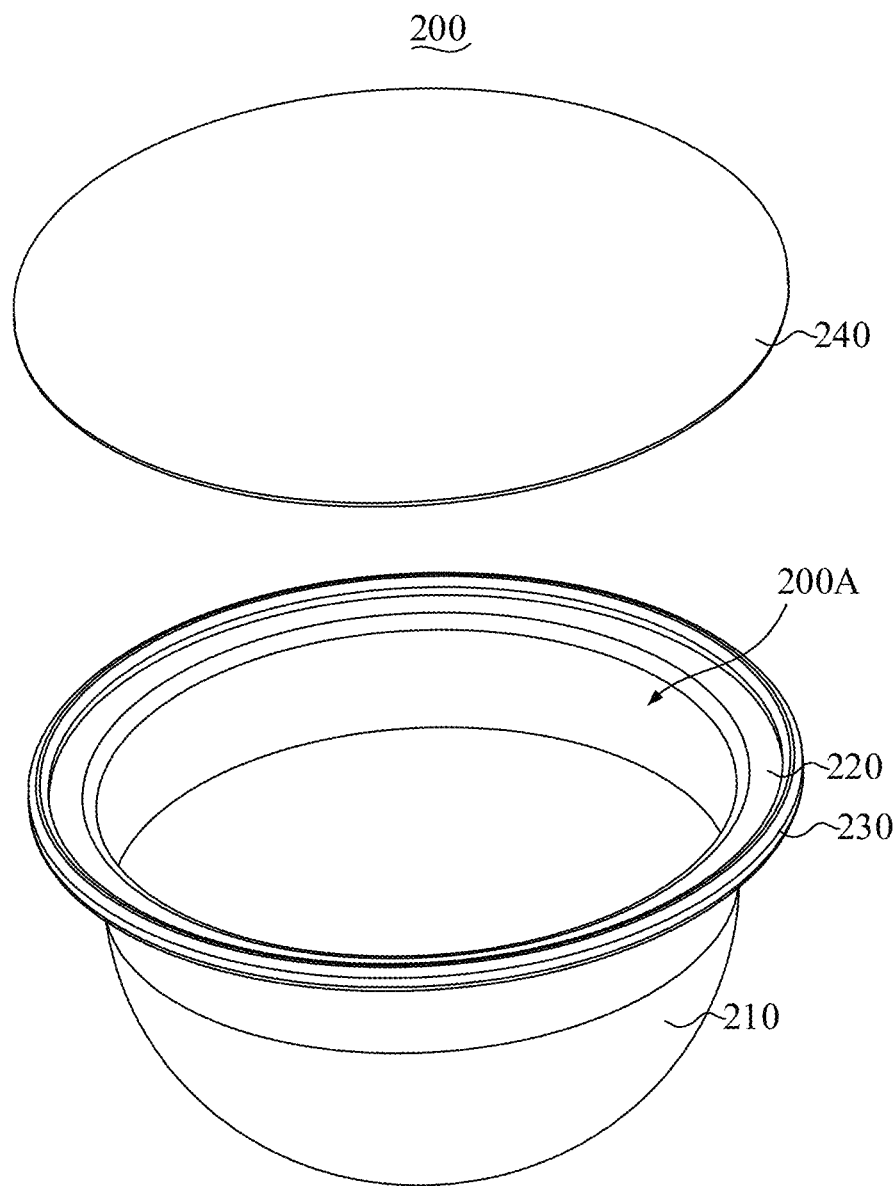
FIG. 1 is a structural schematic diagram of a capsule product according to one embodiment of the present disclosure.

The embodiments of the present disclosure provides a sealing device 1 for a capsule product, the sealing device 1 for the capsule product is configured to seal the capsule product, the capsule product includes a capsule shell 200 and a solid or semi-solid product contained in the capsule shell 200, please refer to FIG. 1, the capsule shell 200 includes a cup body 210, flange 210, and a sealing piece 240, the cup body 210 defines the receiving groove 200A, the flange 220 is annularly connected to a top portion of the cup body 210 and extends in a radial direction, and the sealing piece 240 is attached to the flange 220 and is configured to seal the receiving groove 200A. Specifically, the solid or semi-solid product contained in the capsule shell 200 is selected from granular, pasty, powdered, or leaf-like products, such as coffee, barley, milk powder, tea, etc. For example, the capsule product of the present disclosure is capsule coffee.

Figure 2:
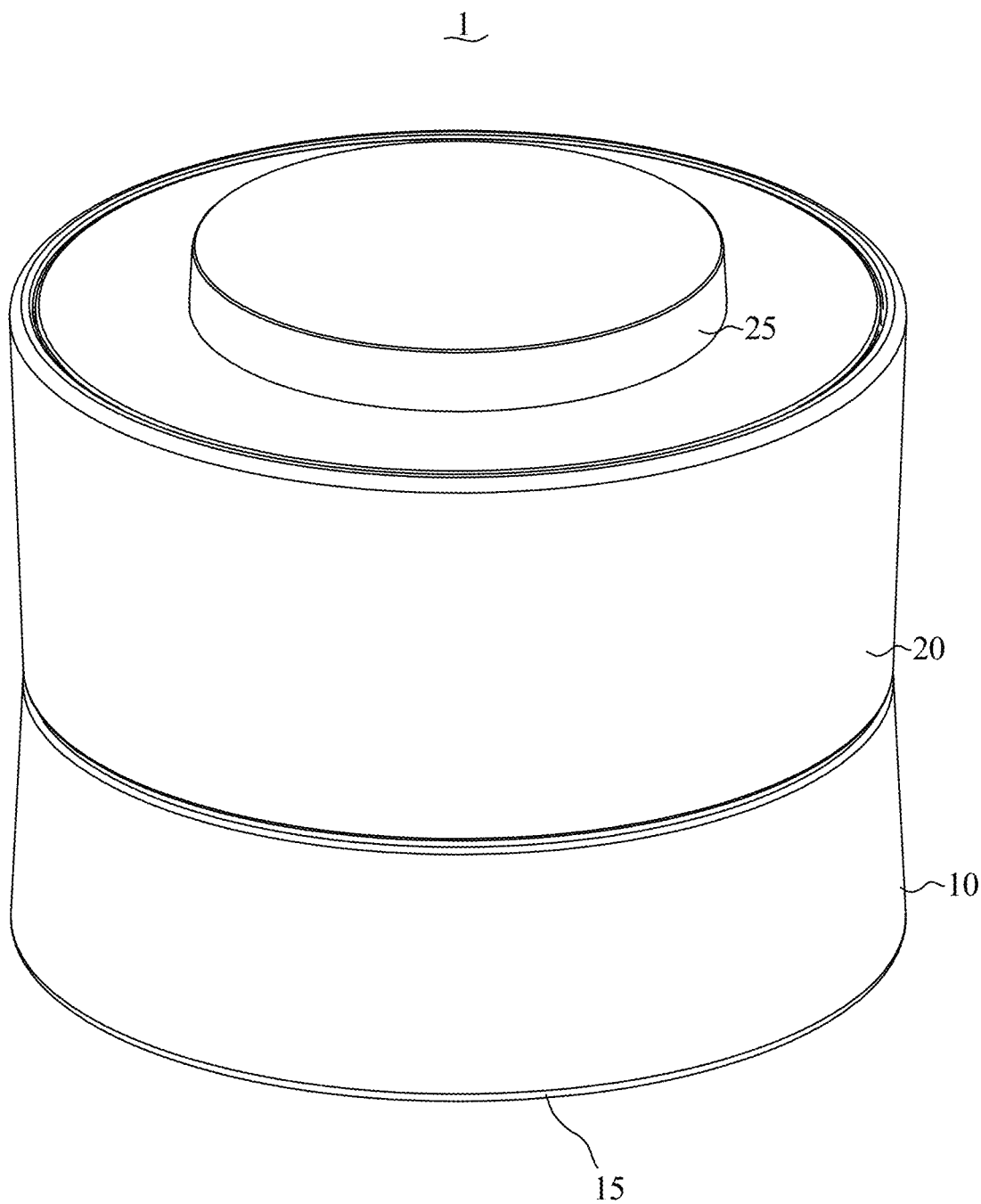
FIG. 2 is a structural schematic diagram of a sealing device for the capsule product according to one embodiment of the present disclosure.
Figure 3:
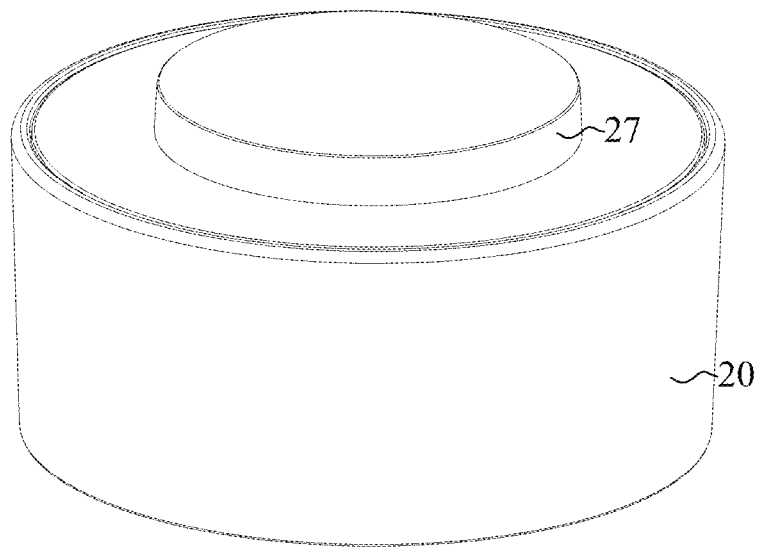
FIG. 3 is an exploded schematic diagram of the sealing device for the capsule product according to one embodiment of the present disclosure.
Figure 3:
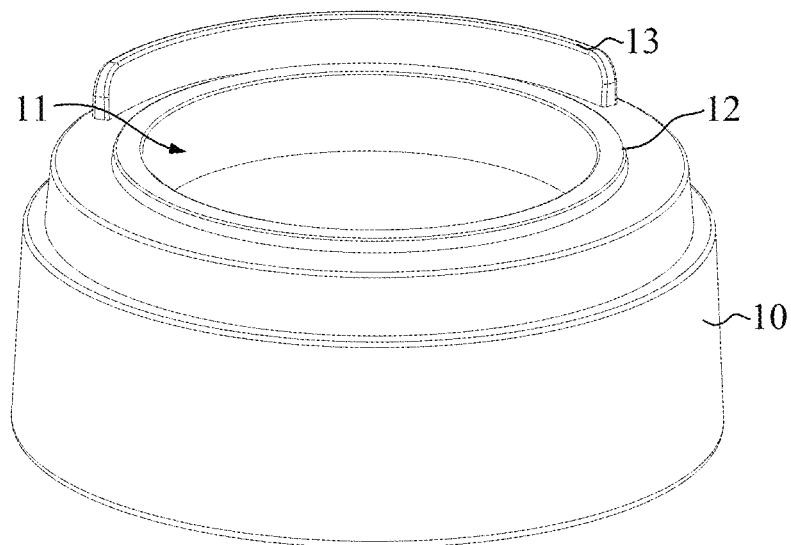

Please refer to FIGS. 2-3, the sealing device 1 for the capsule product, includes a base 10 and an upper cover 20. The base 10 defines an accommodating groove 11 having an upper opening, the accommodating groove 11 is configured to accommodate the cup body 210, an annular protrusion 12 is disposed on an upper surface of the base 10 and is annularly disposed at an outer periphery of the upper opening of the accommodating groove 11, the annular protrusion 12 is configured to support the flange 220. A shape of the accommodating groove 11 is matched with a shape of the cup body 210, an outer surface of the cup body 210 is attached to a groove wall of the accommodating groove 11, so as to stability of the cup body 210 fixing in the accommodating groove 11. In some embodiments, the accommodating groove 11 is of a hemispherical structure. In some other embodiments, the accommodating groove 11 is selected from a columnar structure, a circular truncated cone structure, etc. Certainly, the accommodating groove 11 is capable of accommodating the cup body 210 shaped in different structures, in some other embodiments, the cup body 210 is also not attached to the groove wall of the accommodating groove 11, but is only supported on the annular protrusion 12 by the flange 220 to fix with respect to the base 10. The base 10 includes a positioning baffle 13 disposed at one side of the accommodating groove 11.

Figure 4:
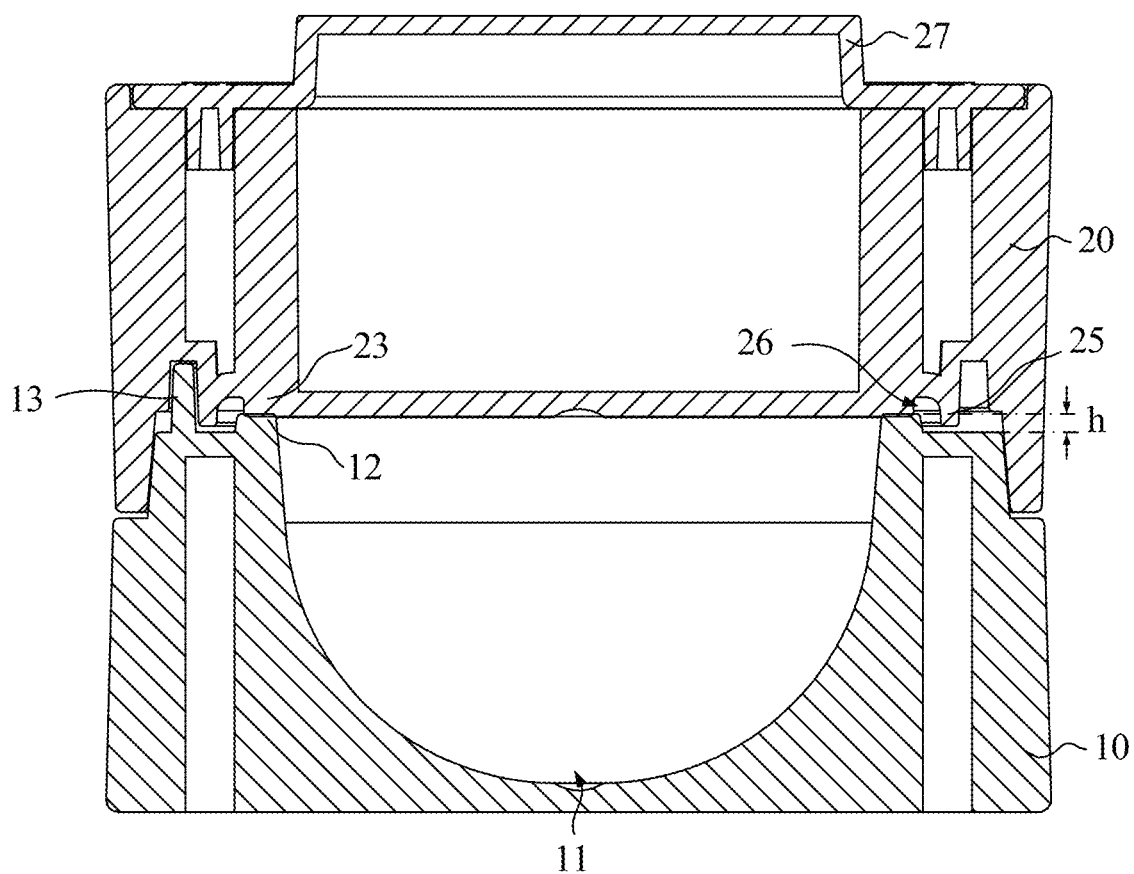
FIG. 4 is a cross-sectional schematic diagram of the sealing device for the capsule product according to one embodiment of the present disclosure.
Figure 5:
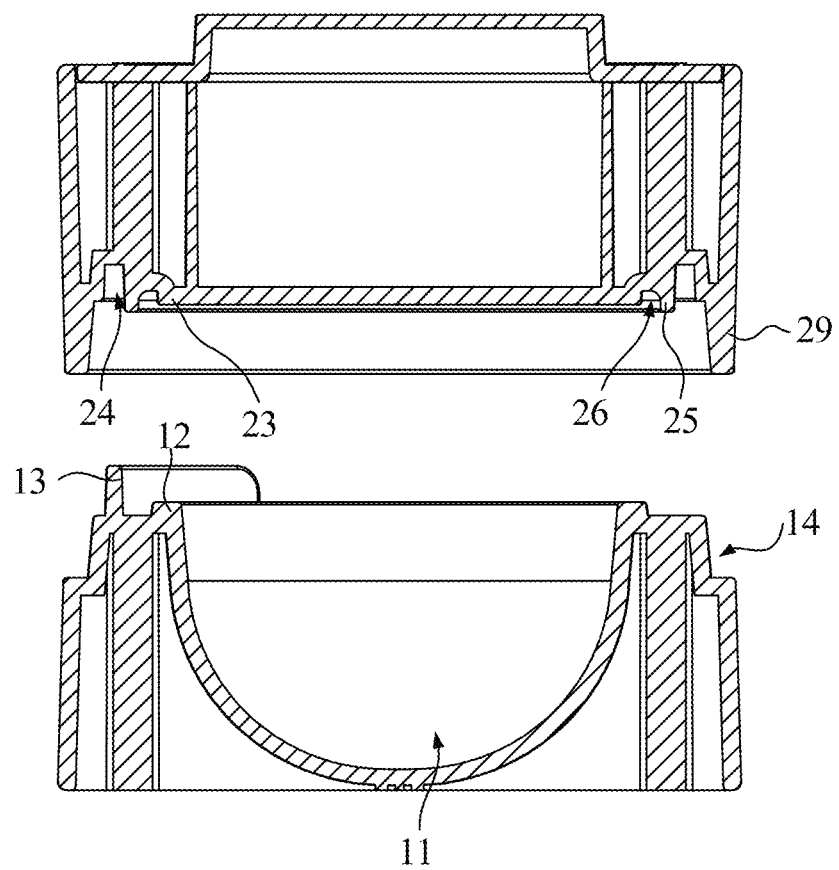
FIG. 5 is a cross-sectional schematic diagram of the sealing device for the capsule product according to one embodiment of the present disclosure where the sealing device for the capsule product is exploded.

The upper cover 20 is detachably connected to the base 10, please refer to FIGS. 4-5, a pressing portion 23 is disposed on a lower surface of the upper cover 20, when the upper cover 20 covers the base 10, the pressing portion 23 is tightly attached to the annular protrusion 12 to seal and attach the sealing piece 240 to the flange 220. Specifically, when using the sealing device 1 for the capsule product of the present disclosure, the cup body 210 is first placed in the accommodating groove 11 and is supported on the annular protrusion 12 by the flange 220, then the solid or semi-solid product is placed in the receiving groove 200A of the cup body 210, an outer wall surface of the sealing piece 240 is abutted against an inner wall of the positioning baffle 13, and then is attached to the flange 220, the upper cover 20 is provided to cover the base 10, the annular protrusion 12 and the pressing portion 23 are matched in a vertical direction to seal and attach the sealing piece 240 to the flange 220, and finally, the upper cover 20 is detached from the base 10 to obtain a new capsule product. It may be understood that an adhesive layer is disposed on a bottom surface of the sealing piece 240, and after a pressure is applied to the sealing piece 240 and the flange 220, the adhesive layer is configured to attach and fix the sealing piece 240 and the flange 220. In this way, external air, moisture, or contaminants are effectively prevented from entering an interior of the capsule shell 200, thereby enabling freshness and quality of the solid or semi-solid product, such as coffee, barley, milk powder, tea, etc., contained in the capsule shell 200.

According to the sealing device 1 for the capsule product of the embodiments of the present disclosure, the upper cover 20 is detachably connected to the base 10, and the annular protrusion 12 is configured to support the flange 220, in a process of covering the base 10 by the upper cover 20, the annular protrusion 12 is matched with the pressing portion 23 of the upper cover 20 to clamp the sealing piece 240 and the flange 220, thereby tightly attaching the sealing piece 240 to the flange 220. When the sealing piece 240 covers the cup body 210, the positioning baffle 13 is configured to limit the sealing piece 240 to prevent the sealing piece 240 from deviating, thereby improving a sealing effect of the sealing piece 240. The sealing device 1 for the capsule product of the embodiments of the present disclosure adopts a simple mechanical structure, which does not need complex processing or expensive materials, the base 10 and the upper cover 20 are both formed by plastic injection molding, being simple in structures, easy to produce, and having low production costs, thereby enabling a better market competitiveness. At the same time, since the sealing device 1 for the capsule product is easy to manufacture, a use cost of a user is also reduced. Moreover, the sealing device 1 for the capsule product of the present disclosure is small in size, which is beneficial to saving storage space and is convenient to carry and transport.

It may be understood that, in an operation process of a capsule coffee maker, the capsule coffee maker may puncture the sealing piece 240, while the cup body 210 is intact, the present disclosure allows the capsule shell 200 to be cleaned and reused once used, the user may select a desired type of coffee to re-place in the cup body 210, and then the upper cover 20 and the base 10 are matched to attach a new sealing piece 240 to the cup body 210 to obtain a new capsule coffee. The present enables a reuse of the cup body 210 of the capsule shell 200, which helps to reduce generation of waste and is more environmentally friendly. The user may also freely select types, brands, and tastes of coffee powder according to their personal preferences and taste requirements, and even try to mix different kinds of coffee powder to create a unique coffee flavor, thereby increasing fun and satisfaction of use.

In some embodiments, please refer to FIG. 5, a positioning concave portion 24 is further defined on the lower surface of the upper cover 20, the positioning baffle 13 is at least partially inserted into the positioning concave portion 24 and slides in the positioning concave portion 24. It should be noted that, the upper cover 20 and the base 10 are rotated to improve pressure applied on the flange 220 and the sealing piece 240 by the annular protrusion 12 and the pressing portion 23, thereby improve sealing stability, and at least partially inserting the positioning baffle 13 into the positioning concave portion 24 and sliding the positioning baffle 13 in the positioning concave portion 24 have a limitation on rotation of the upper cover 20 and the base 10, in this way, the upper cover 20 are prevented from deviating or shaking during the rotation, and the upper cover 20 is further prevented from being disengaged in the radial direction when rotating with respect to the base 10, which further improves the sealing stability.

When the upper cover 20 rotates at a certain angle (less than 360°) with respect to the base 10, the positioning concave portion 24 is of an arc-shaped structure in a circumferential direction of the upper cover 20; when the upper cover 20 rotates 360° with respect to the base 10, the positioning concave portion 24 is of an annular structure in the circumferential direction of the upper cover 20. The positioning baffle 13 may adapt to a shape of the positioning concave portion 24 to be of the annular structure, may also be of the arc-shaped structure or a cylindrical structure. Specific shapes of the positioning baffle 13 and the positioning concave portion 24 are not limited in the present disclosure.

In some embodiments, the capsule shell 200 further includes a crimping edge 230 connected to an outer periphery of the flange 220. It may be understood that, in order to prevent an outer periphery of the capsule shell 200 from damaging humans' hands, the crimping edge 230 is provided to connect to the outer periphery of the flange 220, and if the crimping edge 230 is flattened in the process of covering the base 10 by the upper cover 20, a protection effect of the crimping edge 230 is reduced. Please further refer to FIG. 5, an annular limiting portion 25 is further disposed on the lower surface of the upper cover 20 and is annularly disposed at an outer periphery of the pressing portion 23, an annular recess 26 is formed between the annular limiting portion 25 and the pressing portion 23, the flange 220 is clamped between the pressing portion 23 and the annular protrusion 12, the crimping edge 230 is inserted into the annular recess 26, and an outer periphery of the crimping edge 230 abuts against an inner wall surface of the annular limiting portion 25. The annular recess 26 provides a safe space for the crimping edge 230, so that in the process of covering the base 10 by the upper cover 20, the crimping edge 230 is avoided from being flattened or deformed, which is beneficial for the crimping edge 230 to maintain an original shape and size, thereby ensuring that the protection effect of the crimping edge 230 does not decrease. The outer periphery of the crimping edge 230 abuts against the inner wall surface of the annular limiting portion 25, so that stability of the capsule shell 200 between the base 10 and the upper cover 20 is improved, and the capsule shell 200 is further avoided from shifting, etc.

Figure 6:
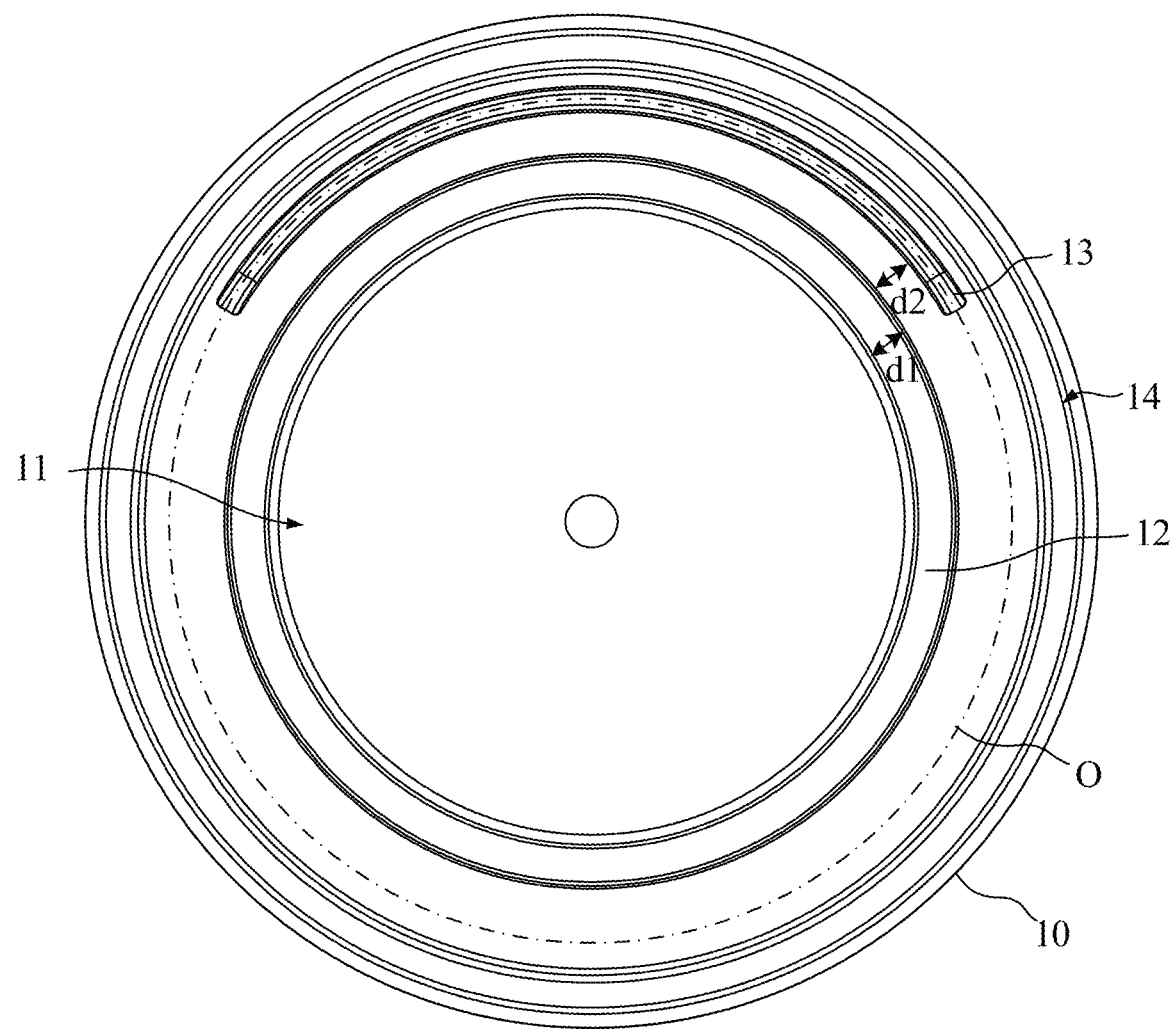
FIG. 6 is a top schematic diagram of a base according to one embodiment of the present disclosure.

In some embodiments, please refer to FIG. 6, in the radial direction, a dimension d1 of the annular protrusion 12 is not less than 0.2 mm and not greater than 5 mm. The dimension d1 of the annular protrusion 12 is matched with a dimension of the flange 220, that is, the dimension of the flange 220 is not less than 0.2 mm and not greater than 5 mm, in this way, increasing a contact area between the flange 220 and the sealing piece 240 is capable of improving a sealing effect of the capsule product. Please further refer to FIG. 4, in a vertical direction, the dimension h of the annular protrusion 12 is not less than 0.1 mm and not greater than 10 mm. Specifically, in the vertical direction, when the dimension h of the annular protrusion 12 is less than 0.1 mm, pressing the upper cover 20 on the base 10 may squeeze the crimping edge 230, and when the dimension h of the annular protrusion 12 is greater than 10 mm, a height of the positioning baffle 13 is affected, it should be understood that, the positioning baffle 13 is capable of limiting the sealing piece 240 only if the height of the positioning baffle 13 is higher than a height of the annular protrusion 12.

In some embodiments, please refer to FIG. 6, the positioning baffle 13 is of an arc-shaped structure, the base 10 has a circle O passing through the positioning baffle 13 in a circumferential direction thereof, an arc length occupied by the positioning baffle 13 on the circle O does not exceed a circumference of the circle and is not less than one quarter of the circumference of the circle O. That is, the positioning baffle 13 is not of an annular structure and has a notch on one side thereof, in this way, when the user holds one side of the sealing piece 240, enough operation space is obtained at the notch, so that the sealing piece 240 is easily and flatly attached to the flange 220. The arc length occupied by the positioning baffle 13 on the circle O does not exceed the circumference of the circle and is not less than one quarter of the circumference of the circle O, and an arc length of the positioning baffle 13 is greater than or equal to one quarter of the circumference of the circle O, so that a contact area between the positioning baffle 13 and the sealing piece 240 is ensured, thereby ensuring a positioning effect of the sealing piece 240.

Certainly, in some embodiments, the positioning baffle 13 includes a plurality of sub-baffles, the plurality of the sub-baffles are disposed at intervals and jointly form a section of the arc-shaped structure, and a length of the arc-shaped structure in the embodiments, that is, an arc length between two outermost sub-baffles of the plurality of the sub-baffles, is set with reference to the above-mentioned form. In the embodiments of the present disclosure, the positioning baffle 23 may be either a continuous structure or a discontinuous structure, and both the continuous structure and the discontinuous structure enables positioning of the sealing piece 240.

In some embodiments, please refer to FIG. 6, in the radial direction, a distance d2 between of an inner wall surface of the positioning baffle 13 and an outer wall surface of the annular protrusion 12 is not less than 0.1 mm and is not greater than 5 mm. That is, in the radial direction, a dimension of the annular recess 26 is not less than 0.1 mm and not greater than 0.5 mm, the dimension of the annular recess 26 is matched with a dimension of the crimping edge 230; if the dimension of the crimping edge 230 is less than 0.1 mm, it is difficult to ensure structural strength thereof, and a processing difficulty of the crimping edge 230 is increased; and if the dimension of the crimping edge 230 is greater than 0.5 mm, a size of the capsule product is affected, and a transportation cost of the capsule product is further increased.

Please refer to FIG. 2, in some embodiments, an anti-slip pad 15 is disposed on a lower surface of the base 10. The anti-skid pad 15 is capable of increasing a friction force between the base 10 and a table or a countertop, which is beneficial for the user to seal the flange 220 and the sealing piece 240 by pressing and rotating the upper cover 20.

Please refer to FIGS. 2-3, in some embodiments, a protruding structure 27 is disposed on an upper surface of the upper cover 20, a shape of the protruding structure 27 is matched with a shape of the upper opening of the accommodating groove 11, and the protruding structure 27 is configured to flatten a powered product in the receiving groove 200A. The protruding structure 27 flattens the powered product in the receiving groove 200A to ensure that a surface of the powered product is flat and free of recesses or protrusions, thereby preventing the powered product in the receiving groove 200A from excessively protruding and affecting the sealing effect of the sealing piece 240.

In some embodiments, the pressing portion 23 is a planar structure extending in a horizontal direction. The pressing portion 23 of the planar structure provides a uniform pressing force when cooperating with the protruding structure 27 to ensure that the sealing piece 240 is uniformly clamped on the flange 220.

Figure 7:
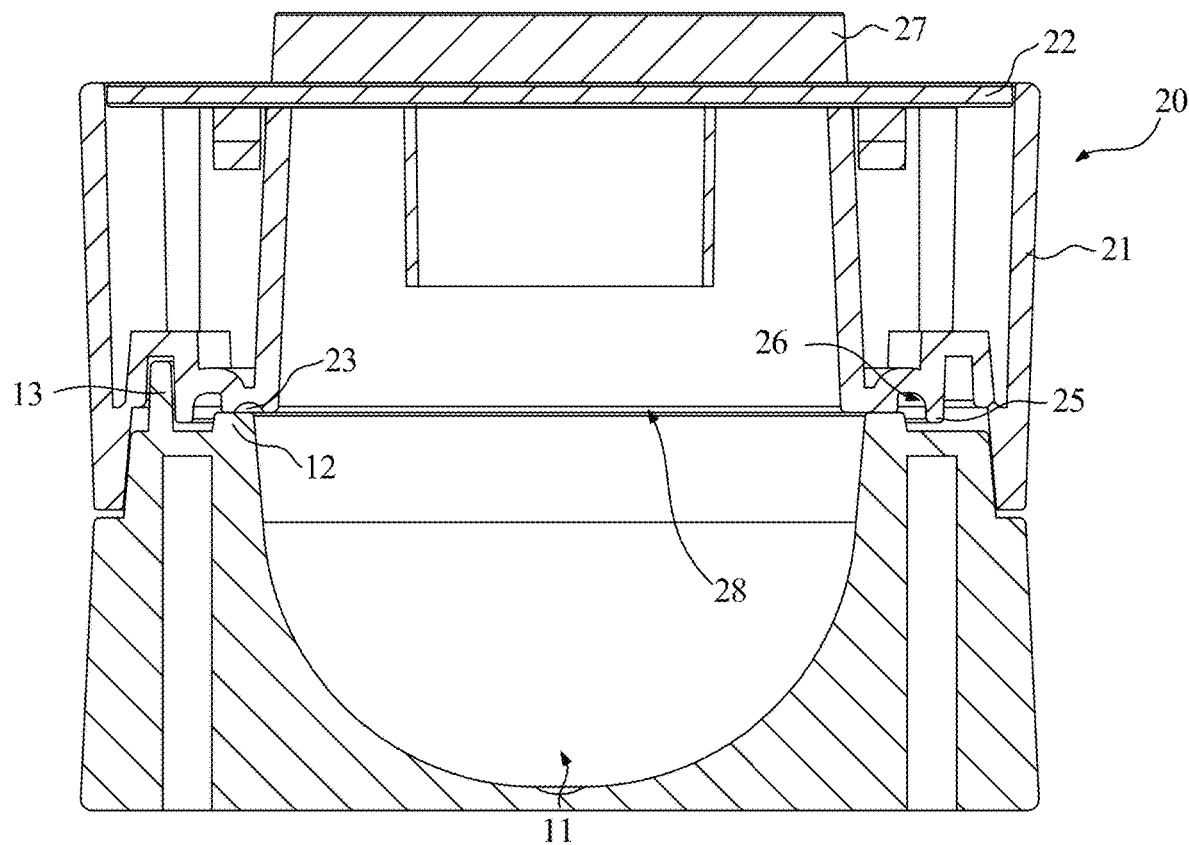
FIG. 7 is a cross-sectional schematic diagram of the sealing device for the capsule product according to another embodiment of the present disclosure.
Figure 8:
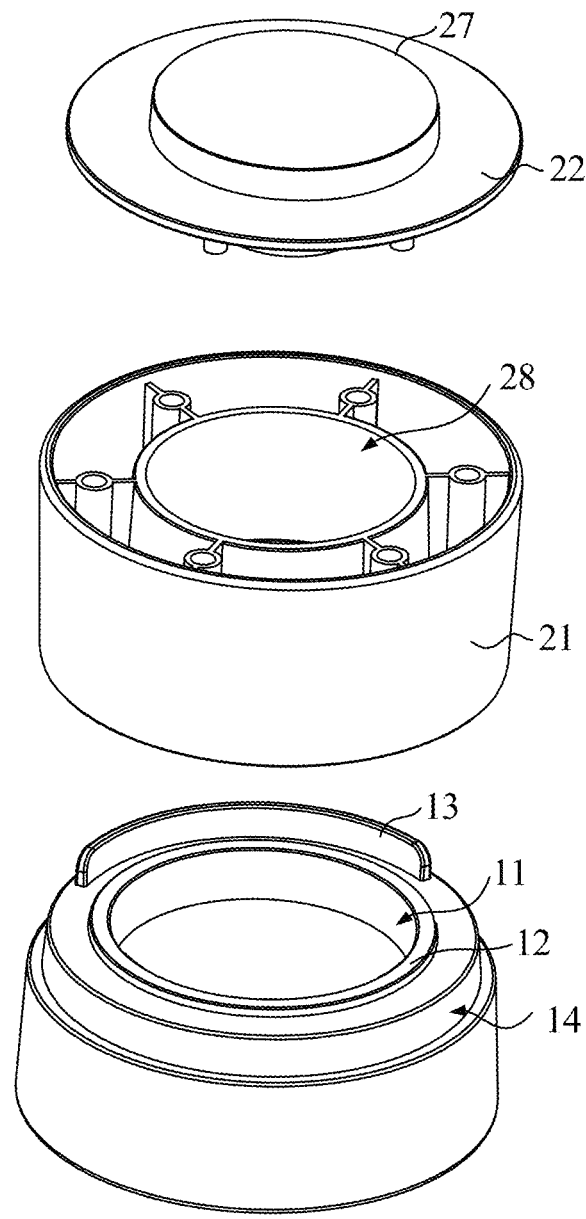
FIG. 8 is an exploded schematic diagram of the sealing device for the capsule product according to another embodiment of the present disclosure.
Figure 9:
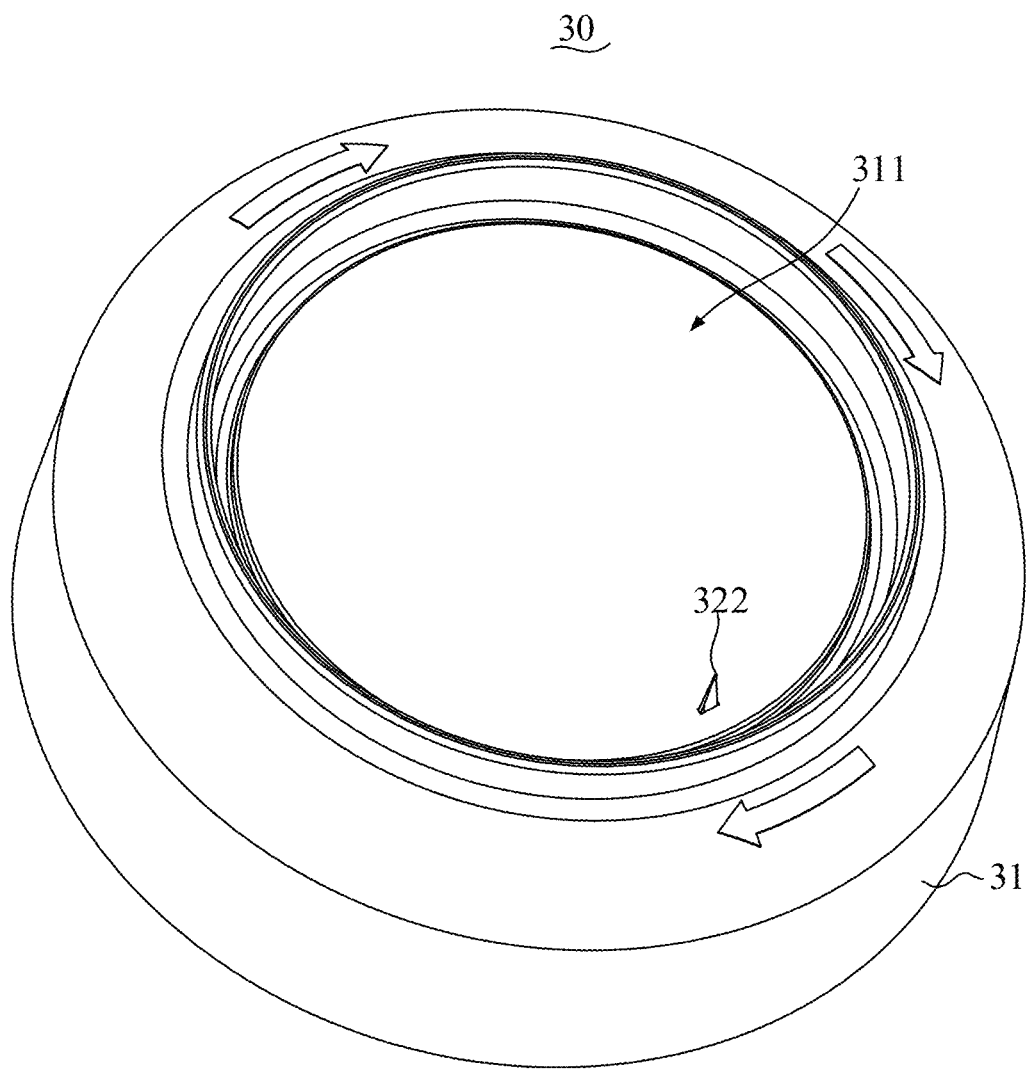
FIG. 9 is a structural schematic diagram of a cutting structure according to one embodiment of the present disclosure.

Please refer to FIGS. 7-8, in some embodiments, the upper cover 20 includes a cover body 21 and a top cover 22, the pressing portion 23 is disposed on a bottom portion of the cover body 21, the pressing portion 23 is of an annular structure matched with the annular protrusion 12, the cover body 21 defines a through hole 28 at an inner side of the pressing portion 23, the top cover 22 is detachably connected to a top portion of the cover body 21 for covering or exposing the through hole 28. When the cover body 21 covers the base 10 and the top cover 22 is detached from the top portion of the cover body 21, a powdered product is placed into a receiving groove 200A through the through hole 28, in this way, a product filling process is simpler, more convenient, and faster, the powdered product, such as the coffee powder, is prevented from being spilling onto the flange 220, which avoids the need to clean the flange 220, saves time, further improves operational convenience.

Please refer to FIG. 5, in some embodiments, the base 10 defines a positioning groove 14 at an outer periphery thereof, a positioning protruding portion 29 is disposed at an outer periphery of the upper cover 20, the positioning groove 14 is configured to limit the positioning protruding portion 29 and is matched with the positioning protruding portion 29, so as to prevent the upper cover 20 and the base 10 from being separated from each other in the radial direction, in this way, stability when the upper cover 20 rotates with respect to the base 10 is improved.

Please refer to FIGS. 9-12, in some embodiments, the sealing device 1 for the capsule product further includes a cutting structure 30, the cutting structure 30 includes a mounting base 31 and a blade assembly 32, a limiting groove 311 is defined on a first side of the mounting base 31, the blade assembly 32 includes a fixing base 321 and a blade 322 fixed on the fixing base 321, the mounting base 31 includes a limiting hole 312 penetrating through two opposite sides thereof, and the limiting hole 312 is defined in the limiting groove 311, the blade 322 partially extends out from the limiting hole 312. The outer periphery of the capsule shell 200 abuts against a groove side wall of the limiting groove 311, the capsule shell 200 rotates in the limiting groove 311, the blade 322 is configured to cut a part of the sealing piece 240 when the capsule shell 200 rotates with respect to the mounting base 31, where the part of the sealing piece 240 is disposed at an inner side of the flange 220. The blade assembly 32 is mounted on the mounting base 31 through the fixing base 321, and the blade 322 partially extends out from the limiting hole 312. When the outer periphery of the capsule shell 200 abuts against the groove side wall of the limiting groove 311 and the capsule shell 200 rotates, the blade 322 is configured to accurately cut the part of sealing piece 240 disposed at the inner side of the flange 220, so that the sealing piece 240 originally with good sealing is effectively and accurately cut, which avoids damage to the capsule shell 200 due to improper cutting and also avoids residues of the sealing piece 240 due to the improper cutting. The limiting groove 311 ensures that the capsule shell 200 is relatively stable in a rotating process and is not prone to slipping or deviating, improves stability and safety of the blade 322 in a cutting process, and further improves cutting efficiency of the blade 322 at the same time.

Figure 12:
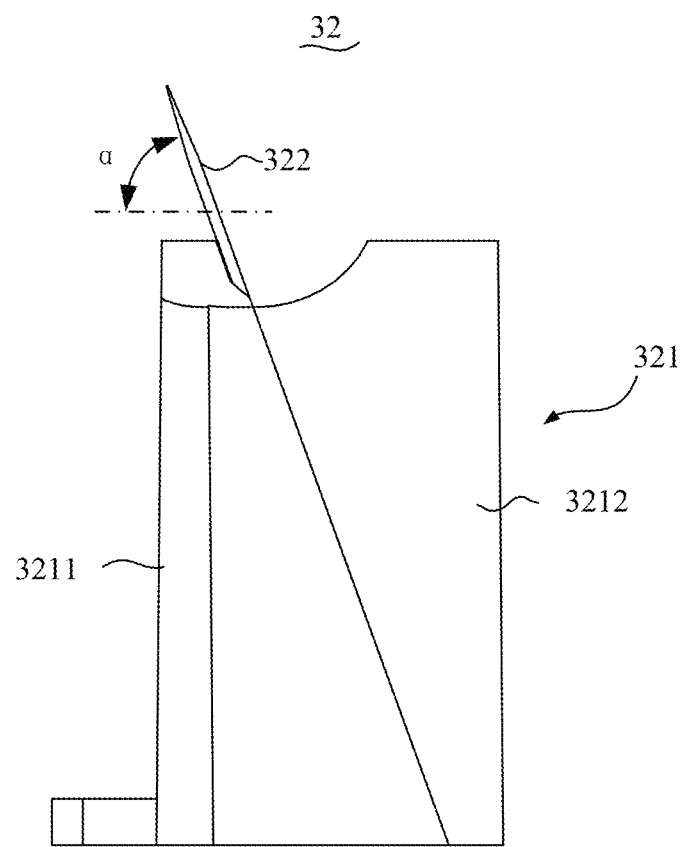
FIG. 12 is a structural schematic diagram of the blade assembly according to one embodiment of the present disclosure.
Figure 13:
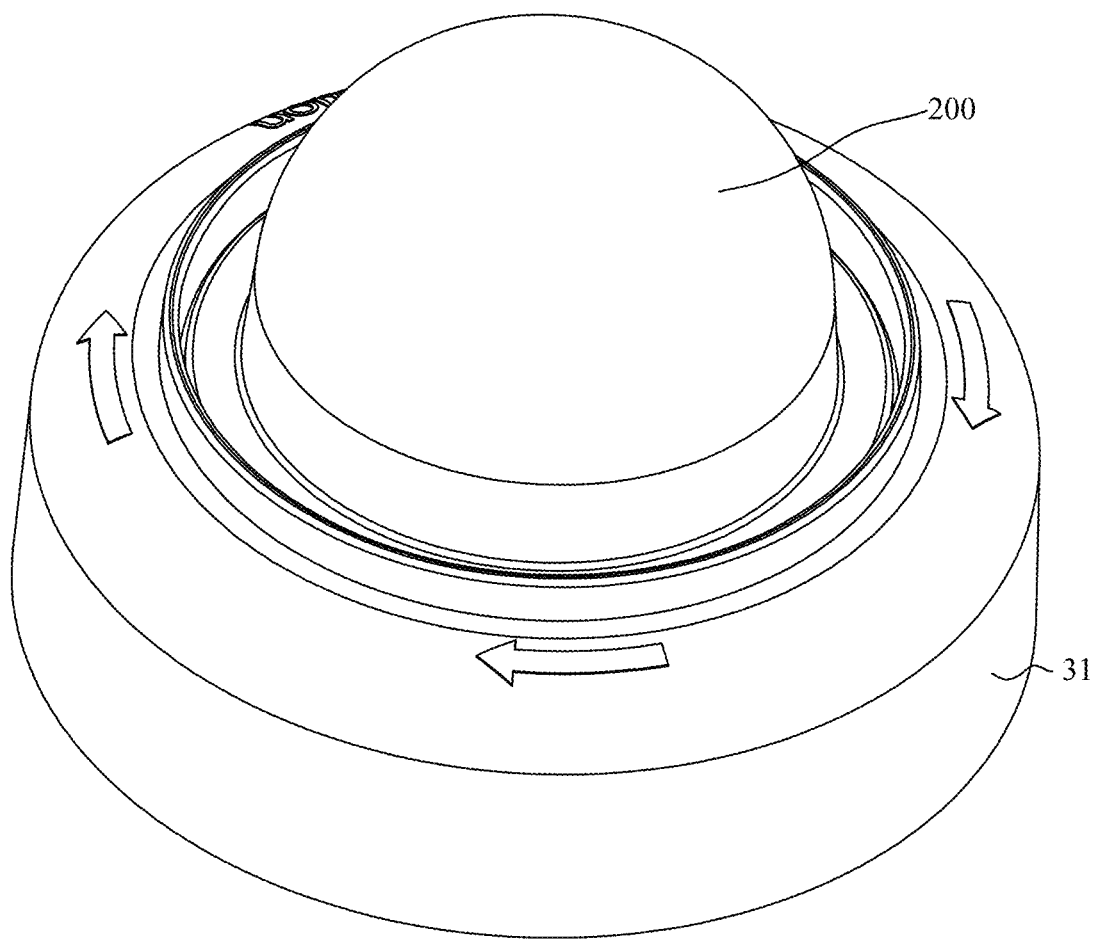
FIG. 13 is a structural schematic diagram of the cutting structure according to one embodiment of the present disclosure where the cutting structure is in a use state.

Please refer to FIG. 12, an included angle is formed between the blade 322 and the horizontal direction, the blade 322 partially extends out from the limiting hole 312 and is inclined in a direction away from an edge of the capsule shell 200. The included angle is formed between the blade 322 and the horizontal direction, so that the blade 322 is capable of generating a sharper cutting angle when cutting the capsule shell 200, so that the blade 322 is easier to cut into and cut the sealing piece 240, cutting efficiency and accuracy thereof are improved, and a risk that the capsule shell 200 may be stuck or damaged in the cutting process is reduced. The blade 322 is inclined in the direction away from the edge of the capsule shell 200, so that frictional resistance between the blade 322 and the capsule shell 200 during the cutting process is reduced. The included angle between the blade 322 and the horizontal direction is α, the α satisfies a relationship as follows:

$$55° \leq \alpha \leq 95°.$$

Specifically, the α is selected from 55°, 60°, 65°, 70°, 75°, 80°, 85°, 90°, 95°, etc.

The fixing base 321 includes a first base body 3211 and a second base body 3212, the first base body 3211 is detachably connected to the second base body 3212, the first base body 3211 includes a first mounting surface, the first mounting surface is inclined, the second base body 3212 includes a second mounting surface, the second mounting surface is inclined, the blade 322 is clamped between the first mounting surface and the second mounting, so as to form the included angle with the horizontal direction. Since the first base body 3211 and the second base body 3212 are detachably connected, the user may easily separate the first base body 3211 and the second base body 3212, which is convenient for installing or replacing the blade 322. Moreover, providing the first mounting surface on the first base body 3211 and providing the second mounting surface on the second base body 3212 facilitates inclination of the blade 322.

Figure 10:
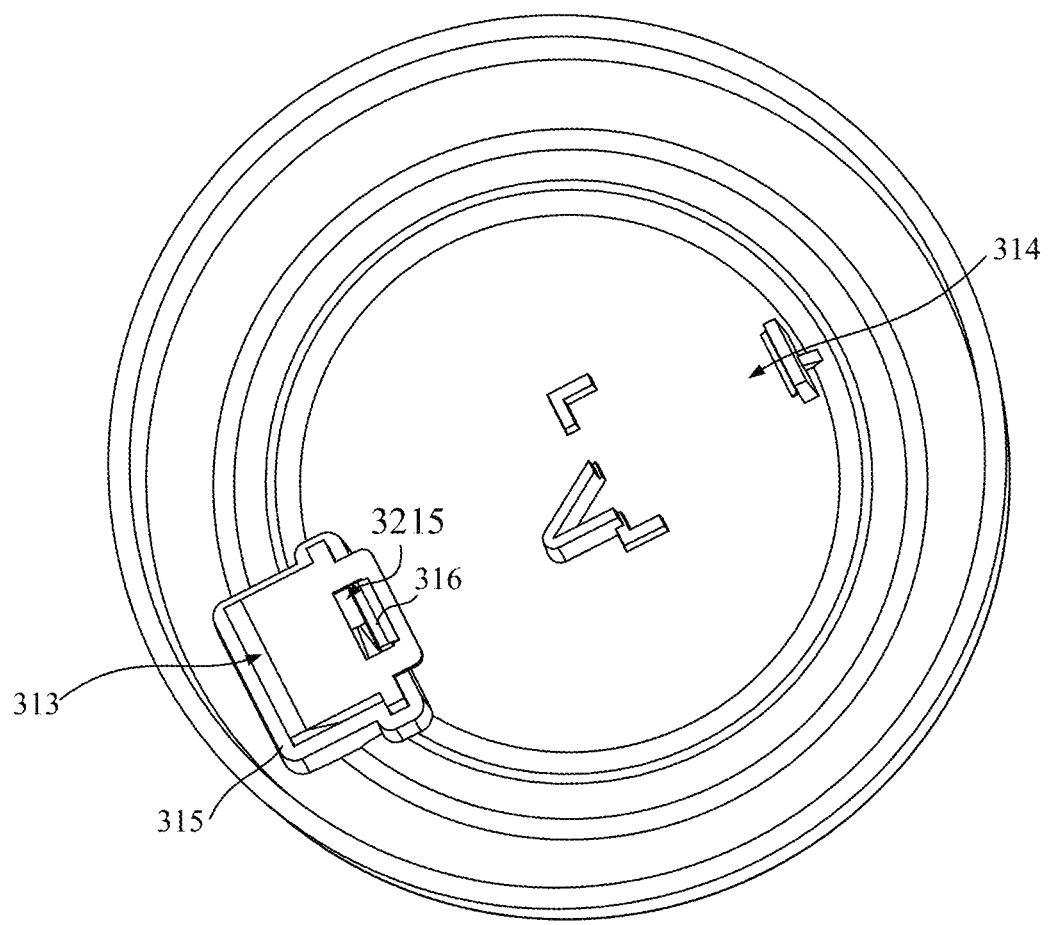
FIG. 10 is a structural schematic diagram of a blade assembly according to one embodiment of the present disclosure where the blade assembly is in a use state.
Figure 11:
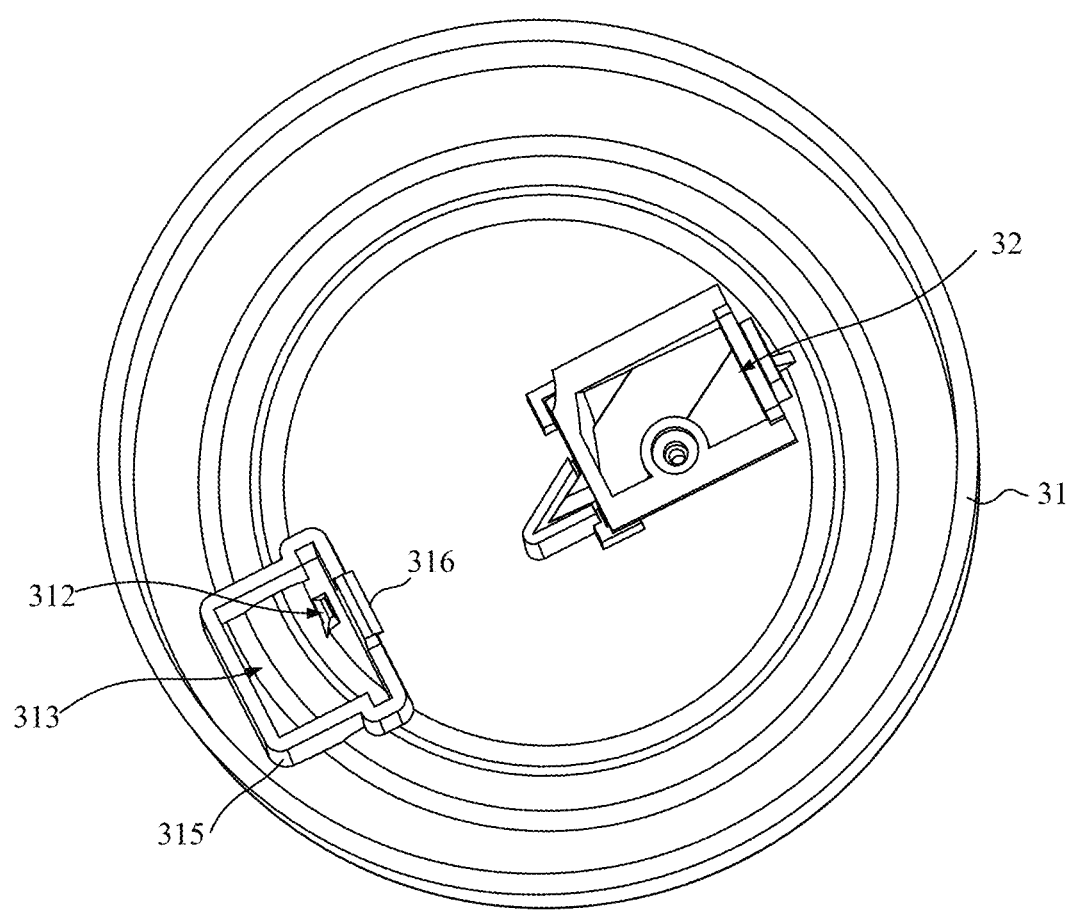
FIG. 11 is a structural schematic diagram of the blade assembly according to one embodiment of the present disclosure where the blade assembly is in an idle state.

Please refer to FIGS. 10-11, a first mounting groove 313 and a second mounting groove 314 are defined on a second side of the mounting base 31 facing away from the limiting groove 311, the first mounting groove 313 is communicated with the limiting hole 312, the blade assembly 32 is fixed at the first mounting groove 313 in a use state, and the blade assembly 32 is accommodated in the second mounting groove 314 in an idle state. In the use state, the blade assembly 32 is firmly fixed at the first mounting groove 313 to ensure stability and accuracy of the cutting process; and in the idle state, the blade assembly 32 is accommodated in the second mounting groove 314, thereby avoiding a safety risk that may be caused by exposure of the blade 322, and also saving space. The blade assembly 32 is easily switched between the first mounting groove 313 and the second mounting groove 314, thereby enabling switching between storage and use.

The mounting base 31 includes a mounting portion 315, the mounting portion 315 defines the first mounting groove 313, the mounting portion 315 includes blocking plates, the blocking plates are connected to one side of the mounting base 31 and are enclosed to form the first mounting groove 313, the mounting portion 315 includes a hook 316, the fixing base 321 defines a clamping groove 3215. When the fixing base 321 is fixed at the first mounting groove 313, the hook 316 is snap-fitted to the clamping groove 3215. Snap connection between the hook 316 and the clamping groove 3215 ensures stability of the fixing base 321 on the mounting portion 315. Such connection manner is not prone to loosening, and effectively prevents the fixing base 321 from shifting or detaching during use, thereby ensuring stability and safety of the cutting process. In some embodiments, the mounting base 31 further includes partition plates, and the partition plates are disposed at intervals, or are sequentially connected to form the second mounting groove 314.

In a second aspect, the embodiments of the present disclosure further provides a first embodiment of an operation method of the sealing device 1 for the capsule product, a structure of the capsule product is the same as that of the foregoing embodiment, and details are not described herein again, the sealing device 1 for the capsule product includes the base 10 and the upper cover 20, the base 10 defines the accommodating groove 11 having the upper opening, the accommodating groove 11 is configured to accommodate the cup body 210, the annular protrusion 12 is disposed on the upper surface of the base 10 and is annularly disposed at the outer periphery of the upper opening of the accommodating groove 11, the annular protrusion 12 is configured to support the flange 220, the base 10 includes the positioning baffle 13 disposed at the one side of the accommodating groove 11, the upper cover 20 is detachably connected to the base 10, the pressing portion 23 is disposed on the lower surface of the upper cover 20.

Figure 14:
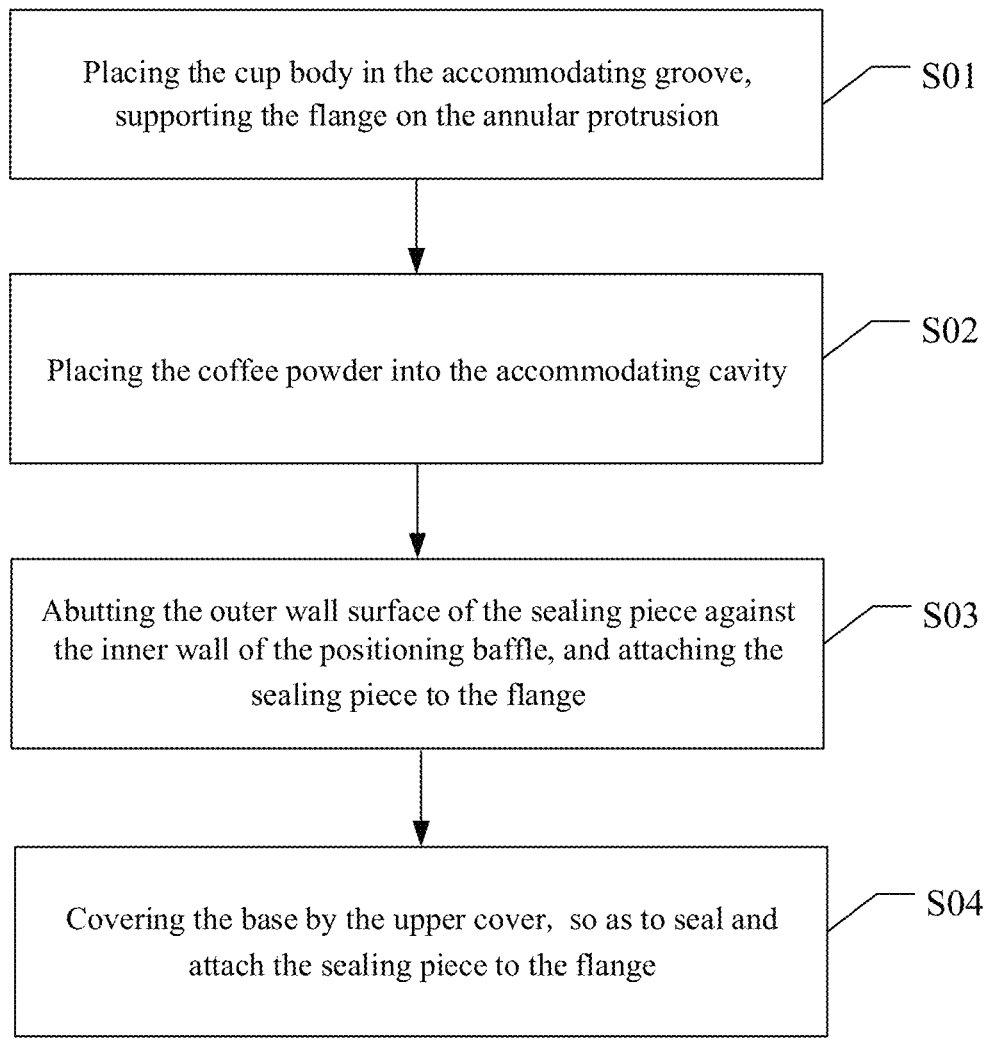
FIG. 14 is a schematic flowchart of an operation method of the sealing device for the capsule product according to one embodiment of the present disclosure.

Taking the capsule coffee as the capsule product and referring to FIG. 14, the operation method of the sealing device 1 for the capsule product includes following steps.

S01: placing the cup body in the accommodating groove, supporting the flange on the annular protrusion.

S02: placing the coffee powder into the receiving groove.

S03: abutting the outer wall surface of the sealing piece against the inner wall of the positioning baffle, and attaching the sealing piece to the flange.

S04: covering the base by the upper cover, so as to seal and attach the sealing piece to the flange.

In some embodiments, after the upper cover 20 covers the base 10, the upper cover 20 is rotated to seal and attach the sealing piece 240 to the flange 220.

In some embodiments, the protruding structure 27 is disposed on the upper surface of the upper cover 20, the shape of the protruding structure 27 is matched with the shape of the upper opening of the accommodating groove 11, in the S02, the protruding structure 27 is configured to flatten the coffee powder in the receiving groove 200A.

In a third aspect, the embodiments of the present disclosure further provides a second embodiment of the operation method of the sealing device 1 for the capsule product, the structure of the capsule product is the same as that of the foregoing embodiment, and details are not described herein again. The sealing device 1 for the capsule product includes the base 10 and the upper cover 20, the base 10 defines the accommodating groove 11 having the upper opening, the accommodating groove 11 is configured to accommodate the cup body 210, the annular protrusion 12 is disposed on the upper surface of the base 10 and is annularly disposed at the outer periphery of the upper opening of the accommodating groove 11, the annular protrusion 12 is configured to support the flange 220, the base 10 includes the positioning baffle 13 disposed at the one side of the accommodating groove 11, the upper cover 20 includes the cover body 21 and the top cover 22, the cover body 21 is detachably connected to the base 10, and the pressing portion 23 is disposed on the bottom portion of the cover body 21, the cover body 21 defines the through hole 28 at the inner side of the pressing portion 23, the top cover 22 is detachably connected to the top portion of the cover body 21 for covering or exposing the through hole 28.

Figure 15:
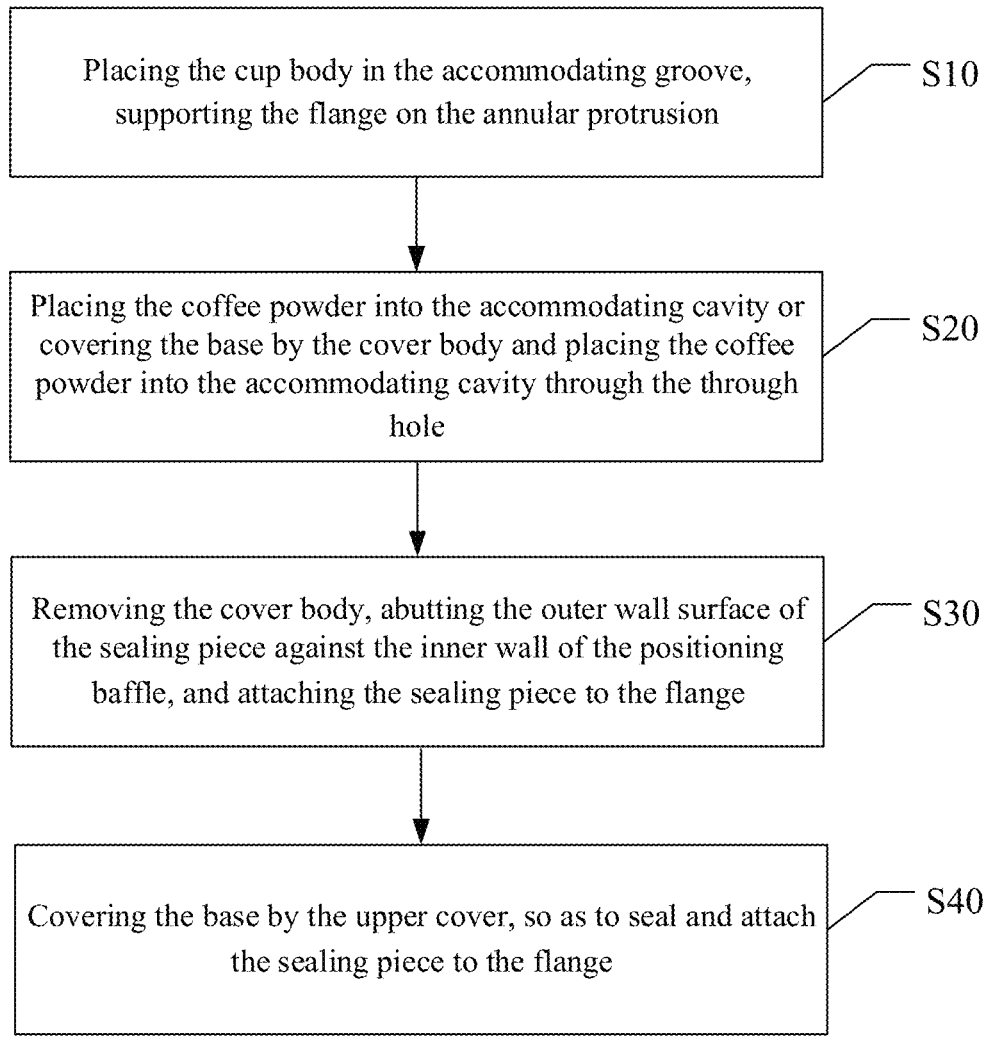
FIG. 15 is a schematic flowchart of the operation method of the sealing device for the capsule product according to another embodiment of the present disclosure Reference numerals in the drawings: 1. sealing device; 10. base; 11. accommodating groove; 12. annular protrusion; 13. positioning baffle; 14. positioning groove; 15. anti-slip pad; 20. upper cover; 21. cover body; 22. top cover; 23. pressing portion; 24. positioning concave portion; 25. annular limiting portion; 26. annular recess; 27. protruding structure; 28. through hole; 29. positioning protruding portion; 30. cutting structure; 31. mounting base; 311. limiting groove; 312. limiting hole; 313. first mounting groove; 314. second mounting groove; 315. mounting portion; 316. hook; 32. blade assembly; 321. fixing base; 3211. first base body; 3212. second base body; 3215. clamping groove; 322. blade; 200. capsule shell; 200A. receiving groove; 210. cup body; 220. flange; 230. crimping edge; 240. sealing piece.

Taking the capsule coffee as the capsule product and referring to FIG. 15, the operation method of the sealing device 1 for the capsule product includes following steps.

S10: placing the cup body in the accommodating groove, supporting the flange on the annular protrusion.

S20: placing the coffee powder into the receiving groove or covering the base by the cover body and placing the coffee powder into the receiving groove through the through hole.

S30: removing the cover body, abutting the outer wall surface of the sealing piece against the inner wall of the positioning baffle, and attaching the sealing piece to the flange.

S40: covering the base by the upper cover, so as to seal and attach the sealing piece to the flange.

In some embodiments, after the upper cover 20 covers the base 10, the upper cover 20 is rotated to seal and attach the sealing piece 240 to the flange 220.

In some embodiments, the protruding structure 27 is disposed on the upper surface of the upper cover 20, the shape of the protruding structure 27 is matched with the shape of the upper opening of the accommodating groove 11, in the S20, the protruding structure 27 is configured to flatten the coffee powder in the receiving groove 200A.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A sealing device for sealing a capsule product, the capsule product comprising a sealing piece configured to seal the capsule product, comprising:

a base; and an upper cover;

wherein the base defines an accommodating groove having an upper opening, and the base further comprises a positioning baffle disposed at one side of the accommodating groove; wherein the positioning baffle protrudes upwards from a side wall of the base and is configured to allow an outermost edge of the sealing piece along a thickness of the sealing piece to abut against an inner sidewall of the positioning baffle facing towards the accommodating groove, wherein the sealing piece is operative to be placed substantially perpendicular to the positioning baffle and abut against the inner sidewall of the positioning baffle for positional alignment; and wherein the upper cover is detachably connected to the base, a pressing portion is disposed on a lower surface of the upper cover;

wherein a positioning concave portion is further defined on the lower surface of the upper cover, the positioning baffle is at least partially inserted into the positioning concave portion and slides in the positioning concave portion.

2. The sealing device for the capsule product according to claim 1, wherein an annular protrusion is disposed on an upper surface of the base and is annularly disposed at an outer periphery of the upper opening of the accommodating groove.

3. The sealing device for the capsule product according to claim 1, wherein the capsule product comprises a capsule shell and the sealing piece, the capsule shell comprises a cup body having a receiving groove, a flange connected to a top portion of the cup body and extending in a radial direction, and a crimping edge connected to an outer periphery of the flange, the sealing piece is attached to the flange and is configured to seal the receiving groove; and an annular limiting portion is further disposed on the lower surface of the upper cover and is annularly disposed at an outer periphery of the pressing portion, an annular recess is formed between the annular limiting portion and the pressing portion, the cup body is disposed in the accommodating groove, the flange is clamped between the pressing portion and the annular protrusion, the crimping edge is inserted into the annular recess, and an outer periphery of the crimping edge abuts against an inner wall surface of the annular limiting portion.

4. The sealing device for the capsule product according to claim 3, wherein the upper cover comprises a cover body and a top cover, the pressing portion is disposed on a bottom portion of the cover body, the pressing portion is of an annular structure matched with the annular protrusion, the cover body defines a through hole at an inner side of the pressing portion, the top cover is detachably connected to a top portion of the cover body for covering or exposing the through hole; and when the cover body is disposed on the base and the top cover is disconnected to the top portion of the cover body, a powdered product is placed into the receiving groove through the through hole.

5. The sealing device for the capsule product according to claim 3, wherein a protruding structure is disposed on an upper surface of the upper cover, a shape of the protruding structure is matched with a shape of the upper opening of the accommodating groove, and the protruding structure is configured to flatten a powered product in the receiving groove.

6. The sealing device for the capsule product according to claim 2, wherein in a radial direction, a distance between an inner wall surface of the positioning baffle and an outer wall surface of the annular protrusion is not less than 0.1 mm and is not greater than 5 mm.

7. The sealing device for the capsule product according to claim 2, wherein in a radial direction, a dimension of the annular protrusion is not less than 0.2 mm and not greater than 5 mm; and/or in a vertical direction, the dimension of the annular protrusion is not less than 0.1 mm and not greater than 10 mm.

8. The sealing device for the capsule product according to claim 1, wherein the pressing portion is a planar structure extending in a horizontal direction.

9. The sealing device for the capsule product according to claim 1, wherein the base defines a positioning groove at an outer periphery thereof, a positioning protruding portion is disposed at an outer periphery of the upper cover, the positioning groove is configured to limit the positioning protruding portion and is matched with the positioning protruding portion, so as to prevent the upper cover and the base from being separated from each other in a radial direction.

10. The sealing device for the capsule product according to claim 1, wherein the positioning baffle is of an arc-shaped structure, the base has a circle passing through the positioning baffle in a circumferential direction thereof, an arc length occupied by the positioning baffle on the circle does not exceed a circumference of the circle and is not less than one quarter of the circumference of the circle.

11. The sealing device for the capsule product according to claim 1, wherein an anti-slip pad is disposed on a lower surface of the base.

12. The sealing device for the capsule product according to claim 1, wherein the capsule product comprises a capsule shell and a sealing piece, the capsule shell comprises a cup body having a receiving groove, a flange connected to a top portion of the cup body and extending in a radial direction, and a crimping edge connected to an outer periphery of the flange, the sealing piece is attached to the flange and is configured to seal the receiving groove;

the sealing device for the capsule product further comprises a cutting structure, the cutting structure comprises a mounting base and a blade assembly, a limiting groove is defined on a first side of the mounting base, the blade assembly comprises a fixing base and a blade fixed on the fixing base, the mounting base comprises a limiting hole penetrating through two opposite sides thereof, and the limiting hole is defined in the limiting groove, the blade partially extends out from the limiting hole; and an outer periphery of the capsule shell abuts against a groove side wall of the limiting groove, the capsule shell rotates in the limiting groove, the blade is configured to cut a part of the sealing piece when the capsule shell rotates with respect to the mounting base, wherein the part of the sealing piece is disposed at an inner side of the flange.

13. The sealing device for the capsule product according to claim 12, wherein an included angle is formed between the blade and a horizontal direction, the blade partially extends out from the limiting hole and is inclined in a direction away from an edge of the capsule shell.

14. The sealing device for the capsule product according to claim 13, wherein the included angle between the blade and the horizontal direction is a, the a satisfies a relationship as follows:

$$55°≤α≤95°.$$

15. The sealing device for the capsule product according to claim 12, wherein the fixing base comprises a first base body and a second base body, the first base body is detachably connected to the second base body, the first base body comprises a first mounting surface, the first mounting surface is inclined, the second base body includes a second mounting surface, the second mounting surface is inclined, the blade is clamped between the first mounting surface and the second mounting, so as to form an included angle with a horizontal direction.

16. The sealing device for the capsule product according to claim 12, wherein a first mounting groove and a second mounting groove are defined on a second side of the mounting base facing away from the limiting groove, the first mounting groove is communicated with the limiting hole, the blade assembly is fixed at the first mounting groove in a use state, and the blade assembly is accommodated in the second mounting groove in an idle state.

17. The sealing device for the capsule product according to claim 16, wherein the mounting base comprises a mounting portion, the mounting portion defines the first mounting groove, the mounting portion comprises a hook, the fixing base defines a clamping groove; and when the fixing base is fixed at the first mounting groove, the hook is snap-fitted to the clamping groove.

18. An operation method of a sealing device for a capsule product, comprising:

placing a cup body of a capsule shell of the capsule product in an accommodating groove of a base of the sealing device for the capsule product, supporting a flange of the cup body on an annular protrusion of the base;

placing a powdered product into a receiving groove of the cup body, or covering the base by a cover body of an upper cover of the sealing device for the capsule product and placing the powdered product into the receiving groove through a through hole of the cover body;

removing the cover body, abutting an outer wall surface of a sealing piece of the capsule shell against an inner wall of a positioning baffle of the base, and attaching the sealing piece to the flange; and covering the base by the upper cover of the sealing device of the capsule product, so as to seal and attach the sealing piece to the flange;

wherein the capsule product comprises the capsule shell and the powdered product contained in the capsule shell, the capsule shell comprises the cup body and the sealing piece, the cup body defines the receiving groove and comprises the flange at a top portion thereof, the flange extends in a radial direction, the sealing piece is attached to the flange and is configured to seal the receiving groove;

the sealing device for the capsule product comprises the base and the upper cover;

the base defines the accommodating groove, the accommodating groove has an upper opening, the annular protrusion is disposed on an upper surface of the base and is annularly disposed at an outer periphery of the upper opening of the accommodating groove, the accommodating groove is configured to accommodate the cup body, the annular protrusion is configured to support the flange, the base comprises the positioning baffle disposed at one side of the accommodating groove, and the positioning baffle is configured to limit the sealing piece; and the upper cover comprises the cover body and a top cover, the cover body is detachably connected to the base, and a pressing portion is disposed on a bottom portion of the cover body, the cover body defines the through hole at an inner side of the pressing portion, the top cover is detachably connected to a top portion of the cover body for covering or exposing the through hole.

19. A sealing device for sealing a capsule product, the capsule product comprising a sealing piece configured to seal the capsule product, comprising:

a base; and an upper cover;

wherein the base defines an accommodating groove having an upper opening, and the base further comprises a positioning baffle disposed at one side of the accommodating groove; wherein the positioning baffle protrudes upwards from a side wall of the base and is configured to allow an outermost edge of the sealing piece along a thickness of the sealing piece to abut against an inner sidewall of the positioning baffle facing towards the accommodating groove, wherein the sealing piece is operative to be placed substantially perpendicular to the positioning baffle and abut against the inner sidewall of the positioning baffle for positional alignment; and wherein the upper cover is detachably connected to the base, a pressing portion is disposed on a lower surface of the upper cover;

wherein an annular protrusion is disposed on an upper surface of the base and is annularly disposed at an outer periphery of the upper opening of the accommodating groove;

wherein in a radial direction, a distance between an inner wall surface of the positioning baffle and an outer wall surface of the annular protrusion is not less than 0.1 mm and is not greater than 5 mm.

* * * * *